324-7

SEARCH ROOM

March 20, 1962 S. APPLEBAUM 3,026,475

FREQUENCY SCANNING FILTER ARRANGEMENT

Filed Jan. 13, 1958 3 Sheets-Sheet 1

INVENTOR:
SIDNEY APPLEBAUM,
BY Michael Masnik
HIS ATTORNEY.

FREQUENCY SCANNING FILTER ARRANGEMENT

Filed Jan. 13, 1958 3 Sheets-Sheet 2

INVENTOR:
SIDNEY APPLEBAUM,
BY Michael Masnik
HIS ATTORNEY.

INVENTOR:
SIDNEY APPLEBAUM,
BY Michael Masnik
HIS ATTORNEY.

United States Patent Office 3,026,475

Patented Mar. 20, 1962

3,026,475

FREQUENCY SCANNING FILTER ARRANGEMENT

Sidney Applebaum, Liverpool, N.Y., assignor to General Electric Company, a corporation of New York Filed Jan. 13, 1958, Ser. No. 708,733
14 Claims. (Cl. 324—77)

This invention relates to methods and arrangements for scanning a band of signal frequencies to determine the frequency spectrum of any signal in the band.

It is oftentimes desirable in the electrical art to identify the existence of signals having particular characteristics. For example, it is sometimes desired to detect the existence of a signal of a given frequency in a background of noise or undesired signals. One method for isolating and detecting desired signals is to employ a series of relatively narrow band filters each covering a discrete portion of the overall bandwidth under investigation. By observing the outputs of the various filters, the existence of the desired signals can be detected and their frequency identified.

In some instances, it is desirable to have an adjustable filter arrangement in order that the filter may be more exactly matched to the signals to be identified regardless of their position in the frequency spectrum under observation. This feature is particularly desirable where the signal to be investigated is undergoing shift in frequency. The prior art arrangements unfortunately have been unable to accommodate these demands in the past.

It is therefore an object of my invention to provide an improved frequency scanning method and arrangement.

It is another object of my invention to provide an improved signal processing arrangement and method.

It is a further object of my invention to provide a matched filter arrangement whose frequency characteristic can be scanned under the control of a desired scanning signal.

It is a further object of my invention to provide an improved arrangement for detecting the existence of signals and/or identifying their frequency.

Briefly, in accordance with one embodiment of the invention a multitap time delay line arrangement is employed for surveying a band of frequencies. The time delay circuit has an input tap and a plurality of output taps dimensioned to provide a signal $S(t)$ applied to its input tap at each of said output taps with successively greater time delays of $k\tau$ where $k$ is any integer 0, 1, 2, . . . $n$ and $\tau$ is the time delay between taps. The summation of the various time delayed signals essentially provides a filter output having a predetermined amplitude versus frequency characteristic. A time varying scanning signal is employed for shifting said last-named characteristic output along the frequency domain to provide modified signals. The modified signals are then added and compared in time phase with the scanning signal for purposes of identifying the signal frequencies applied to the multitap delay line.

Figure 2:
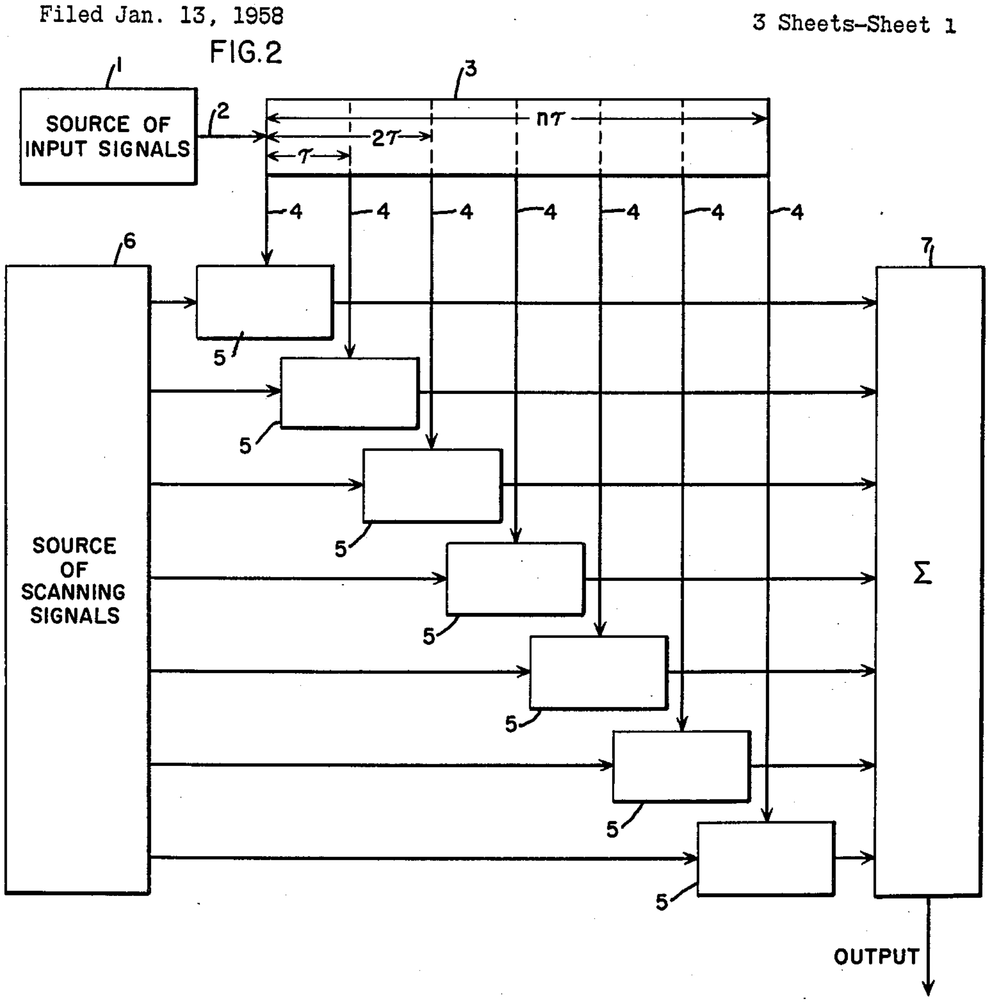
Figure 1:
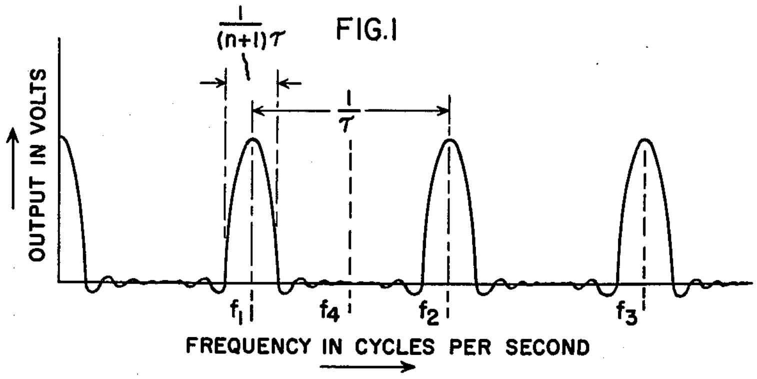
Figure 3:
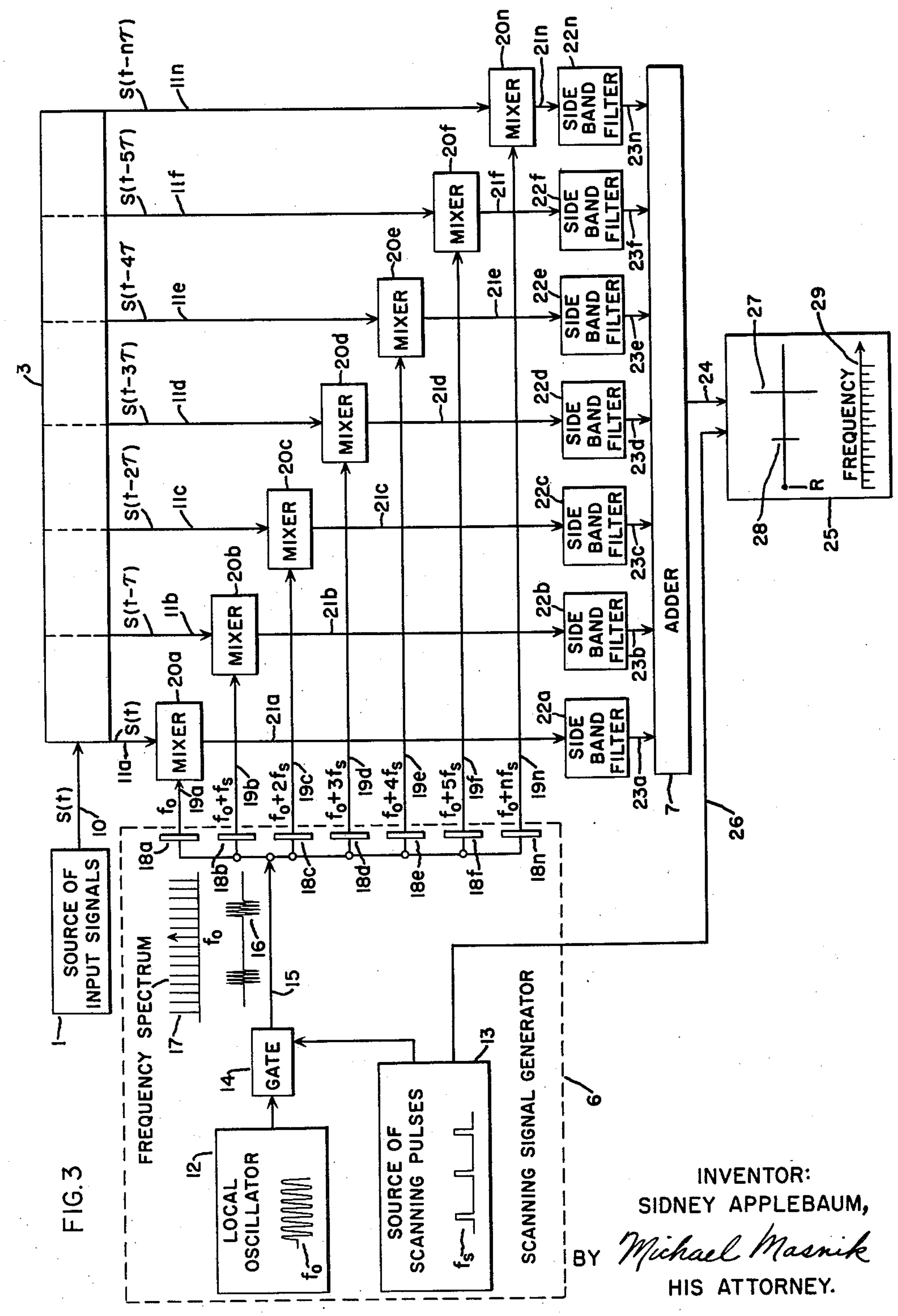

For better understanding of my invention, reference is made to the following description taken in connection with the accompanying drawings and the appended claims wherein FIG. 1 graphically illustrates certain principles of the present invention, FIG. 2 schematically illustrates the broad functioning of the invention, FIG. 3 illustrates in block diagram form one embodiment of the present invention, and FIGS. 4*a*–*d* illustrate waveforms and circuitry useful in explaining the invention.

Referring now to FIG. 1 there is shown the frequency response characteristic of a time invariant transverse comb filter. This figure illustrates the voltage amplitude of the output signals (plotted as ordinate) passed by the filter in response to input signals of different frequency (plotted as abscissa). The characteristic indicates that at frequencies $f_1$, $f_2$, $f_3$ the filter exhibits maximum outputs. Thus if it is desired to detect the presence of a signal, as for example of frequency $f_2$, the unknown signal is applied to the filter arrangement having the characteristic described. Detection of a maximum output indicates the presence of an input signal at frequency $f_2$. Similarly, if signals of frequency $f_1$ or $f_3$ are present, they will be detected by the comb filter as a maximum output. However, should a signal be present of a frequency intermediate the peaks of the filter response characteristic, as for example at frequency $f_4$, the filter would not permit identification of this frequency. Obviously comb filters can be dimensioned to detect other fixed frequencies in the overall bandwidth under investigation. To detect all frequencies in a given bandwidth would require a plurality of such fixed frequency comb filters. However, in accordance with the present invention, all frequencies can be accommodated with a single comb filter. Briefly, the invention involves effectively scanning the frequency response characteristic of a comb filter over a frequency domain such that the filter characteristic successively peaks, i.e., provides a maximum output, at all frequencies within the band of signals under investigation.

Referring to FIG. 2, there is shown one embodiment of the present invention. Signals, for example, of several unknown frequencies, are applied over lead 2 to a multitap delay line circuit 3. Circuit 3 may comprise an arrangement of lumped or distributed circuit elements adapted to yield a signal available on input lead 2 at one of the multiple output taps 4 with an appropriate time delay.

Thus far, the arrangement of FIG. 2 constitutes the prior art. If one were to properly weigh each of the delayed outputs available on 4 and then sum them up, at this point, one would obtain the customary output from a static, transverse comb filter. The time delay $\tau$ determines the separation between peaks in the response characteristic (FIG. 1). If only one such peak is desired within the band of interest, $\tau$ should be dimensioned to be equal or less than the reciprocal of the bandwidth to be investigated. The longer the total delay of the delay line, the sharper is the resolution of the filtering action. That is, the characteristic peaks shown in FIG. 1 become narrower with an increase in the overall length of the delay line. Unfortunately, as has been previously mentioned, the arrangement described thus far is static, and the circuit has only limited usefulness. In order to accommodate signals of any frequency within an overall bandwidth under consideration, applicant has employed the following principles.

Applicant has discovered that by modifying in circuits 5, each of the signals available on the output leads 4 in accordance with a set of scanning signals available from source 6, and then vectorially adding the modified signals in circuit 7, a resultant effect may be achieved corresponding to having the comb filter characteristics, as for example shown in FIG. 1, scan through the frequency domain under investigation. This technique permits rapid and efficient detection of signals of any frequency within the bandwith under surveillance.

The detailed functioning of the present invention will now be described by reference to FIG. 3. For purposes of simplicity, common reference numerals have been resorted to in the various drawings wherever desirable. Source 1 supplies at an output lead 10 signals to be processed. The output of source 1 may be one or several signals of any form, such as noise, sinusoidal, pulse, etc.—and be modulated or unmodulated in any manner. For purposes of discussion, we designate the signals available on lead 10 with the single symbol $S(t)$. The signals $S(t)$ are applied to delay line 3 for purposes of being successively delayed by timed period $k\tau$ where $k$ is an integer 1, 2, 3, . . . $n$, where $n$ is the number of delay line taps and $\tau$ is related to the frequency bandwidth being investigated or processed and to the desired filtering effect (that is, the number of separate peaks desired in the filter characteristic). Thus the signal $S(t)$ appears, for example, on output lead 11$b$ with a time delay $\tau$ as $S(t-\tau)$, and on the ouput lead 11$c$ with a time delay $2\tau$ as $S(t-2\tau)$, etc. Applicant has discovered that by properly modulating the angles, that is modulating the phase or frequency, of the various signals available on the output lead 11$a$, $b$, $c$, . . . $n$, and vectorially adding these, a result can be achieved corresponding to that of a scanning matched filter. One arrangement for providing a scanning filter using frequency shifting as the angle modulation, employs a source 12 of local oscillations $f_0$ and a source 13 of scanning pulses at the repetition rate $f_s$. The local oscillations $f_0$ are applied to the gating circuit 14 where they are gated by the scanning pulses $f_s$ to output lead 15. They appear on output lead 15 as gated oscillations 16 having a discrete frequency spectrum as shown at 17.

The signals 16 are applied to a bank of crystal filters 18$a$, $b$, . . . $n$, corresponding to the number of delay line taps. Each filter is dimensioned to pass a different one of the frequency components in signals 16 such that sinusoidal waves of different frequency, as illustrated, appear at the respective output leads 19$a$, $b$, . . . $n$. The discrete frequencies available on leads 19$a$, $b$, . . . $n$ are mixed with the time delayed signals available on the corresponding output leads 11$a$, $b$, . . . $n$ in respective mixer circuits 20$a$, $b$, . . . $n$. The outputs of mixer circuits 20$a$, $b$, . . . $n$ available on respective leads 21$a$, $b$, . . . $n$ are applied to respective side band filters 22$a$, $b$, . . . $n$. Filters 22$a$, $b$, . . . $n$ are dimensioned to pass only one of the sidebands appearing in the mixer outputs, as for example the upper side bands, such that the time delayed signals available on leads 11$a$, $b$, . . . $n$ appear at the output leads 23$a$, $b$, . . . $n$ with a respective frequency shift corresponding to the frequencies of the related sinusoidal waves appearing on leads 19$a$, $b$, . . . $n$.

The repetition rate $f_s$ determines the rate at which the frequency band of interest is scanned, that is, the rate at which the peak or peaks of the filter response (FIG. 1) are moved through a distance of $1/\tau$ cycles per second. Thus $f_s$ may be dimensioned to provide any desired scanning rate. In general, in order to avoid loss of information available in the signal $S(t)$, the frequency of $f_s$ is selected to equal or exceed the frequency bandwidth of the signal under surveillance. The frequency $f_0$ is selected to facilitate the separation and rejection of one of the sidebands resulting from the mixing process in 20$a$, $b$, $c$, . . . $n$. By widely separating the sidebands by a judicious selection of the frequency $f_0$, the filtering necessary to achieve separation and rejection may be simplified.

The output signals available at the output leads 23$a$, $b$, . . . $n$ of each of the side band filters 22 are applied to and vectorially added in circuit 7. The output of circuit 7, available on lead 24, is effectively the input signal $S(t)$ (appearing on lead 10) modified by having been passed through a scanning comb filter and being shifted in frequency by a frequency $f_0$.

To demonstrate the action of the present invention for identifying or processing signals, let us assume that the input signal is of the simple sinusoidal form $E \sin -2\pi ft$ where:

$E$=maximum amplitude in volts
$f$=frequency of input signal in cycles per second
$t$=seconds The voltage $e_k$ developed at the $k$th lead 11 can be shown to be:

$$e_{11k}=E \sin 2\pi f(t-k\tau)$$

where $k\tau$=time delay in seconds
$n\tau$=total delay of the delay line

The voltage developed at the $k$th lead 23 can be shown to be:

$$e_{23k}=E \sin 2\pi[f(t-k\tau)+(f_0+kf_s)t]$$

After summing up in adder 7 all of the voltages available on leads 23, it can be shown that the output voltage $e_{24}$ from the adder circuit 7 is:

$$e_{24}=\frac{E \sin \pi(n+1)(f\tau-f_st)}{\sin \pi(f\tau-f_st)} \sin 2\pi\left[(f+f_0)t-\frac{n}{2}(f\tau-f_st)\right]$$

The envelope of $e_{24}$ is:

$$E\left|\frac{\sin \pi(n+1)(f\tau-f_st)}{\sin \pi(f\tau-f_st)}\right|$$

If this envelope is displayed on a cathode ray oscilloscope whose sweep frequency is synchronized to the scanning frequency, $f_s$, the resultant display will be a $$\left|\frac{\sin (n+1)X}{\sin X}\right|$$

function centered at a position corresponding to the frequency of the input signal. If the frequency of the input signal is changed, the $$\left|\frac{\sin (n+1)X}{\sin X}\right|$$

function will shift to a new position corresponding to the new input signal frequency.

The amplitude of the peak indication 27, for purposes of simplification, is proportional to the amplitude of the input signal and the horizontal displacement of the peak 27 from the frequency reference point R identifies the frequency of the input signal. If the input signal also contained a component of different frequency and amplitude, the indication would be as shown at 28. A comparison of the two indications 27 and 28 would show which of the two input signal components had the larger amplitude and their horizontal displacement would indicate the difference in their frequencies.

An analysis of the output voltage $e_{24}$ would show a signal $E \sin 2\pi ft$ had been applied to lead 10 from source 1. This analysis may be carried out with the aid of a cathode ray tube 25 of the type having a sweep potential applied to the horizontal deflection plates and the signal $e_{24}$ applied to the vertical deflection plates. In FIG. 3, the output voltage $e_{24}$ is applied over lead 24 to the oscilloscope 25 and the sweep potential source in oscilloscope 25 is synchronized with the repetition rate of the scanning signal $f_s$ available on lead 26. The oscilloscope may be calibrated as shown at 29 to indicate directly the frequency of the input signals being detected or processed.

Thus, since the reference point for the frequency measurement R is defined by the scanning pulses available over lead 26, the output signal $e_{24}$ is made to occur at a time position on indicator 25 corresponding to the frequency of the input signal $S(t)$. Thus, by process of summing a sequence of successively time delayed and frequency shifted versions of the input signals $S(t)$, applicant has succeeded in displaying the input signal on a time position scale such that the frequency may be readily identified.

While the present invention was described mathematically in connection with a simple input signal of the form $E \sin 2\pi ft$ and a uniform weighting of the outputs available on leads 11, the invention is more generally applicable to other input wave forms as previously mentioned and may be designed with other than uniform weightings. For example, by varying the relative weights of the signals available on leads 23, as by phase and/or amplitude change, the shape of the comb filter characteristic (see FIG. 1) can be changed while retaining the important scanning feature under control of the source 6 (see FIG. 2).

Figure 4A:
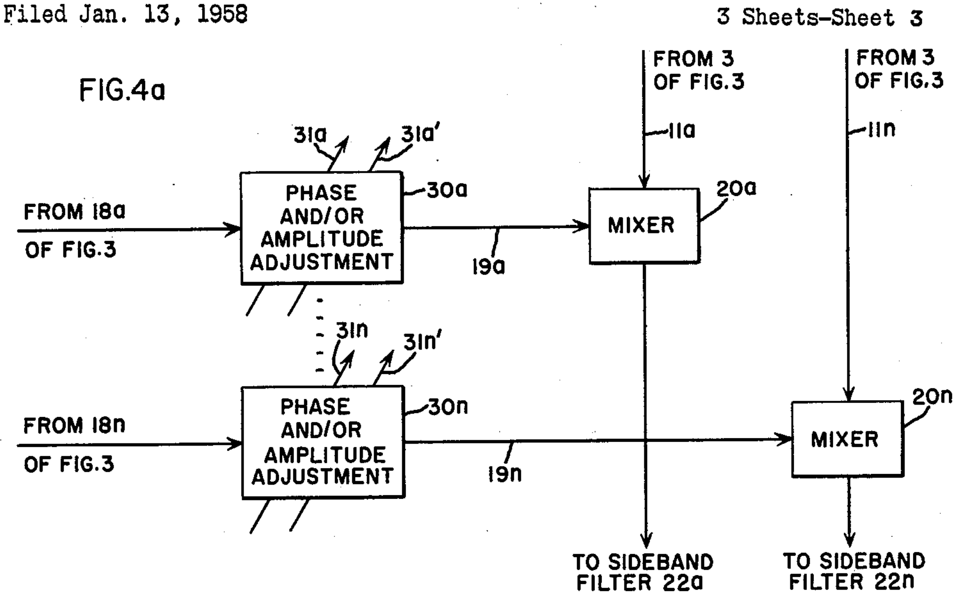
Figure 4B:
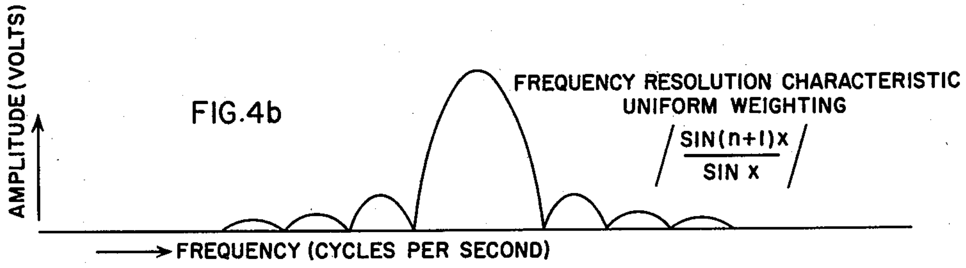
Figure 4C:
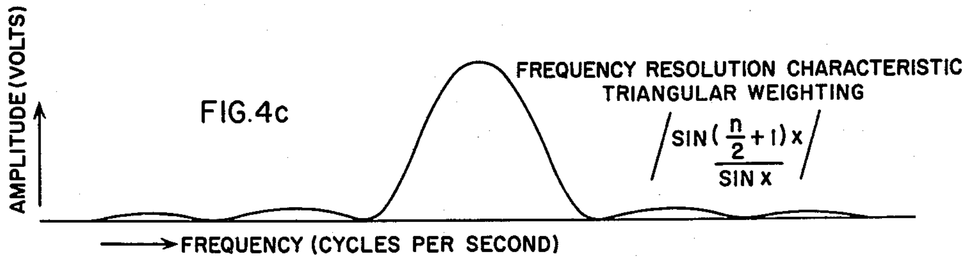
Figure 4D:
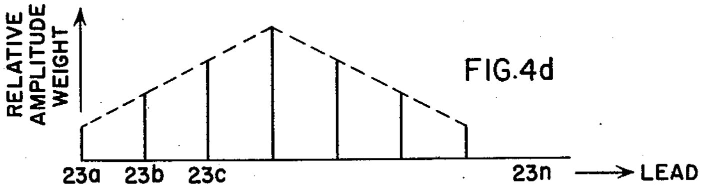

One embodiment of phase and/or amplitude weighting is illustrated in FIG. 4*a*. The scanning signals available on leads 19*a, b, c, . . . n* are applied to respective circuits 30*a, b, c, . . . n* where they are adjusted in phase and/or amplitude by means of controls 31*a, b, c, . . . n* and 31*a', b', c', . . . n'* to achieve a desired comb filter characteristic shape. For example, if a constant frequency test signal is applied to input lead 10, the signal inputs to adder 7 appearing on leads 23*a, b, c, . . . n* are uniformly weighted when their amplitudes are equal and the phases are such that a maximum peak output is received upon addition in adder 7. This means that periodically signals available on 23*a, b, c, . . . n* add algebraically to have an amplitude equal to $(n+1)$ times the amplitude of the signal available on any one of the output leads 23*a, b, c, . . . n*. This uniform weighting results in the comb filter characteristic $$\left|\frac{\sin (n+1)X}{\sin X}\right|$$

shown in FIG. 4*b*. To achieve the characteristic shown in FIG. 4*c*, the amplitude weighting for each of the signals available at leads 23*a, b, c, . . . n* is adjusted accordance with the triangular characteristic shown in FIG. 4*d*.

Although in FIG. 4*a* the phase and/or amplitude adjustment is shown being performed on the signals available on leads 19*a, b, c, . . . n*, it can be performed on the signals available on leads 11*a, b, c, . . . n*, 21*a, b, c, . . . n* or 23*a, b, c, . . . n*, i.e., anywhere in the circuit where it will reflect in the desired weighting of the signals being applied to adder 7.

The present invention has application to many types of input wave forms in addition to that previously considered in explaining the operation of FIG. 3. An example is an input signal comprising a train of periodic pulses with a repetition period of T seconds, where the carrier frequency components of the individual pulses are phase coherent, i.e., appear as pulse amplitude modulations of a continuous carrier frequency oscillation. Such a signal may be processed in the arrangement of FIG. 3 to perform, in effect, a coherent integration on $n+1$ successive pulses where the timing of the resultant, integrated output signal is indicative of the frequency of the carrier oscillations and may be displayed on an indicator such as 25 of FIG. 3. To perform such an integration, the incremental time delay $\tau$ of the delay line is dimensioned to be equal to T, the pulse repetition period, and the bandwidth of the time delay and angle modification circuits dimensioned to pass the train of pulses.

Also, whereas FIGS. 1 and 3 illustrate the time delaying process by the time delay circuit 3 as being performed on the input signal available on lead 10 before the input signal is angle modified, the two processes can be practised in other sequences and even combined. For example, the time delaying can be accomplished after the angle modification.

Finally, while the invention has been described in terms of a process involving successively time delaying and angle modifying an input signal in a predetermined sequence to provide a plurality of output signals having equal increments of time delay, for example, $\tau$, $2\tau$, . . . $n\tau$, and equal increments of angle between respective ones of said plurality of output signals, wherein said increment of angle varies as a predetermined function of time, it may be desirable under certain circumstances to omit one or more of the plurality of output signals. In the case where the plurality of signals are vectorially added, this would amount to weighting the undesired signals with a zero amplitude weight.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a source of an input signal occurring within a band of frequencies, means for deriving an output signal equivalent to having passed said input signal through a linear filter which has linearly frequency scanned said band of frequencies comprising means for successively time delaying said input signal by equal increments of time which are independent of the frequency of said input signal and for shifting the frequency of said input signal by equal increments of frequency to derive a plurality of time delayed and frequency shifted signals, means for weighting each of said time delayed and frequency shifted signals to derive weighted signals comprising means for changing the phase of each of said time delayed and frequency shifted signals in a predetermined manner and means for changing the amplitude of each of said time delayed and frequency shifted signals in a predetermined manner, means for vectorially adding each of said weighted signals to derive said output signal, and means for utilizing said output signal.

2. In combination, a source of an input signal occurring within a band of frequencies, means for deriving an output signal equivalent to having passed said input signal through a linear filter which has linearly frequency scanned said band of frequencies comprising means for successively time delaying said input signal by equal increments of time which are independent of the frequency of said input signal and for shifting the frequency of said input signal by equal increments of frequency to derive a plurality of time delayed and frequency shifted signals, means for weighting each of said time delayed and frequency shifted signals to derive weighted signals comprising means for changing the phase of each of said time delayed and frequency shifted signals in a predetermined manner and means for changing the amplitude of each of said time delayed and frequency shifted signals in a predetermined manner, means for vectorially adding each of said weighted signals to derive said output signal, and means for comparing the timing of said output signal with the timing of said equal increments of frequency shifting to determine the frequency of said input signal.

3. An arrangement for processing an input signal occurring within a band of frequencies comprising means for successively time delaying said input signal by equal increments of time which are independent of the frequency of said input signal and for shifting the frequency of said input signal by equal increments of frequency to derive a plurality of time delayed and frequency shifted signals, means for weighting each of said time delayed and frequency shifted signals to derive weighted signals comprising means for changing the phase of each of said time delayed and frequency shifted signals in a predetermined manner and means for changing the amplitude of each of said time delayed and frequency shifted signals in a predetermined manner, means for vectorially adding each of said weighted signals to derive sum signals, and means for utilizing said sum signals.

4. An arrangement for processing input signals occurring within a band of frequencies comprising means for successively time delaying said input signals by equal increments of time which are independent of the frequency of said input signals and for modifying the angle of each of said time delayed signals in accordance with respective predetermined functions of time to derive a plurality of time delayed and angle modified signals, means for weighting each of said time delayed and angle modified signals to derive weighted signals comprising means for changing the phase of each of said time delayed and angle modified signals in a predetermined manner and means for changing the amplitude of each of said time delayed and angle modified signals in a predetermined manner, means for vectorially adding each of said weighted signals to derive sum signals, and means for utilizing said sum signals.

5. An arrangement for processing input signals occurring within a band of frequencies comprising means for successively time delaying said input signals by equal increments of time which are independent of the frequency of said signals and for modifying the angle of each of said time delayed signals in accordance with successive multiples of a predetermined function of time to derive time delayed and angle modified signals, means for weighting each of said time delayed and angle modified signals to derive weighted signals comprising means for changing the phase of each of said time delayed and angle modified signals in a predetermined manner and means for changing the amplitude of each of said time delayed and angle modified signals in a predetermined manner, means for vectorially adding each of said weighted signals to derive sum signals, and means for utilizing said sum signals.

6. An arrangement for processing an inut signal comprising means for successively time delaying said input signal by equal increments of time and for modifying the angle of said input signal by equal increments of angle, which increments are varied in accordance with a predetermined function of time to derive a plurality of time delayed and angle modified signals, means for combining said plurality of signals to derive an output signal, and means for utilizing said output signals.

7. An arrangement for processing input signals occurring within a band of frequencies comprising means for successively time delaying said input signals by equal increments of time which are independent of the frequency of said input signals and for shifting the frequency of each of said time delayed signals to derive a plurality of time delayed and frequency shifted signals, said means for shifting frequency comprising a source of a plurality of scanning signals differing by equal increments of frequency and means for mixing each of said time delayed signals with a respective one of said scanning signals, means for weighting each of said time delayed and frequency shifted signals to derive weighted signals comprising means for changing the phase of each of said time delayed and frequency shifted signals in a predetermined manner and means for changing the amplitude of each of said time delayed and frequency shifted signals in a predetermined manner, means for vectorially adding each of said weighted signals to derive sum signals, and means for utilizing said sum signals.

8. An arrangement for processing input signals occurring within a band of frequencies comprising means for successively time delaying said input signals by equal increments of time and for shifting the frequency of each of said time delayed signals by equal increments of frequency to derive weighted time delayed and frequency shifted signals, means for vectorially adding each of said weighted signals to derive sum signals, and means for utilizing said sum signals.

9. An arrangement for processing input carrier frequency pulses of a given pulse recurrence rate $f$ comprising means for successively time delaying said input pulses by equal time increments of $1/f$ and for modifying the angles of the carrier frequency of each of said input pulses by equal increments of angle wherein the increment of angle varies as a function of time to provide time delayed and angle modified signals, and means for vectorially adding each of said last-named signals to derive sum signals, and means for utilizing said sum signals.

10. A method for processing input signals comprising the step of successively time delaying said signals by equal increments of time for providing time delayed signals, the step of modifying the angle of each of said time delayed signals in accordance with successive multiples of a predetermined function of time to derive time delayed and angle modified signals, the step of changing the phase of each of said time delayed and angle modified signals in a predetermined manner to derive changed signals, and the step of vectorially adding each of said changed signals to derive sum signals.

11. An arrangement for processing a train of recurrent pulses having carrier frequency components comprising means operative in a given sequence for changing the angle of the carrier frequency components of successive one of said pulses in said train in accordance with a time varying progression and for time delaying the successive pulses of said train such that the successive pulses of said train occur simultaneously in time with angle modified carrier frequency components, and means for vectorially adding said simultaneously occurring pulses with angle modified carrier frequency components to provide an output signal.

12. An arrangement for processing a train of periodic pulses having phase coherent, carrier frequency components comprising means operative in a given sequence for changing the angle of the carrier frequency components of successive one of said pulses in said train in accordance with the progression $$(A+B)+(2A+B)+(3A+B)+\ldots(nA+B)$$

where A and B are predetermined functions of time, and for time delaying the successive pulses of said train such that successive pulses of said train occur simultaneously in time with angle modified carrier frequency components, means for modifying the phase and means for modifying the amplitude of said last-named pulses to provide modified pulses, and means for vectorially adding said simultaneously occurring modified pulses to provide an output signal.

13. An arrangement for processing a train of periodic pulses having phase coherent, carrier frequency components comprising means operative in a given sequence for changing the angle of the carrier frequency components of successive one of said pulses in said train in accordance with a time varying progression and for time delaying the successive pulses of said train such that the successive pulses of said train occur simultaneously in time with angle modified carrier frequency components, means for modifying the phase and means for modifying the amplitude of said last-named pulses to provide modified pulses, and means for vectorially adding said modified pulses to provide an output signal.

14. A method for processing input signals comprising the step of successively time delaying said signals by equal increments of time for providing time delayed signals, the step of modifying the angle of each of said time delay signals in accordance with successive multiples of a predetermined function of time to derive time delayed and angle modified signals, the step of changing the phase and amplitude of each of said time delayed and angle modified signals in a predetermined manner to derive changed signals, and the step of vectorially adding each of said changed signals to derive sum signals.

References Cited in the file of this patent

UNITED STATES PATENTS

| | | |
|---|---|---|
| 2,596,460 | Arenberg | May 13, 1952 |
| 2,666,181 | Courtillot | Jan. 12, 1954 |
| 2,680,151 | Boothroyd | June 1, 1954 |
| 2,676,206 | Bennett et al. | Apr. 20, 1954 |
| 2,897,442 | Wright et al. | July 28, 1959 |
| 2,916,724 | Peterson | Dec. 8, 1959 |